United States Patent [19]

Dimmick

[11] 4,103,327

[45] Jul. 25, 1978

[54] INTERRUPT CONTROL CIRCUIT

[75] Inventor: James Owen Dimmick, Boulder, Colo.

[73] Assignee: Bell Telephone Laboratories, Incorporated, Murray Hill, N.J.

[21] Appl. No.: 779,142

[22] Filed: Mar. 18, 1977

[51] Int. Cl.² ............................................. G06F 9/18
[52] U.S. Cl. .................................................... 364/200
[58] Field of Search ... 364/200 MS File, 900 MS File

[56] References Cited

U.S. PATENT DOCUMENTS 3,309,672   3/1967   Brun ..................................... 364/200

*Primary Examiner*—James D. Thomas
*Attorney, Agent, or Firm*—Donald M. Duft

[57] ABSTRACT

Processor circuitry is disclosed for setting a memory address register to a predetermined address upon the receipt of an interrupt request. The receipt of the request extends a steady state signal through an AND gate to the input of the counter to hardwire jam it to a predetermined address which defines the memory location of the first word of a subroutine associated with the request. The jam signal remains on the register input until the addressed memory location is read out. A readout of this location disables the AND gate and removes the jam signal from the counter. The AND gate is restored to normal when the last word of the subroutine is read out to permit new interrupt requests to be honored. The continuous application of the jam signal to the register until the addressed location is read out increases the probability of the register being successfully set to the correct address.

9 Claims, 1 Drawing Figure

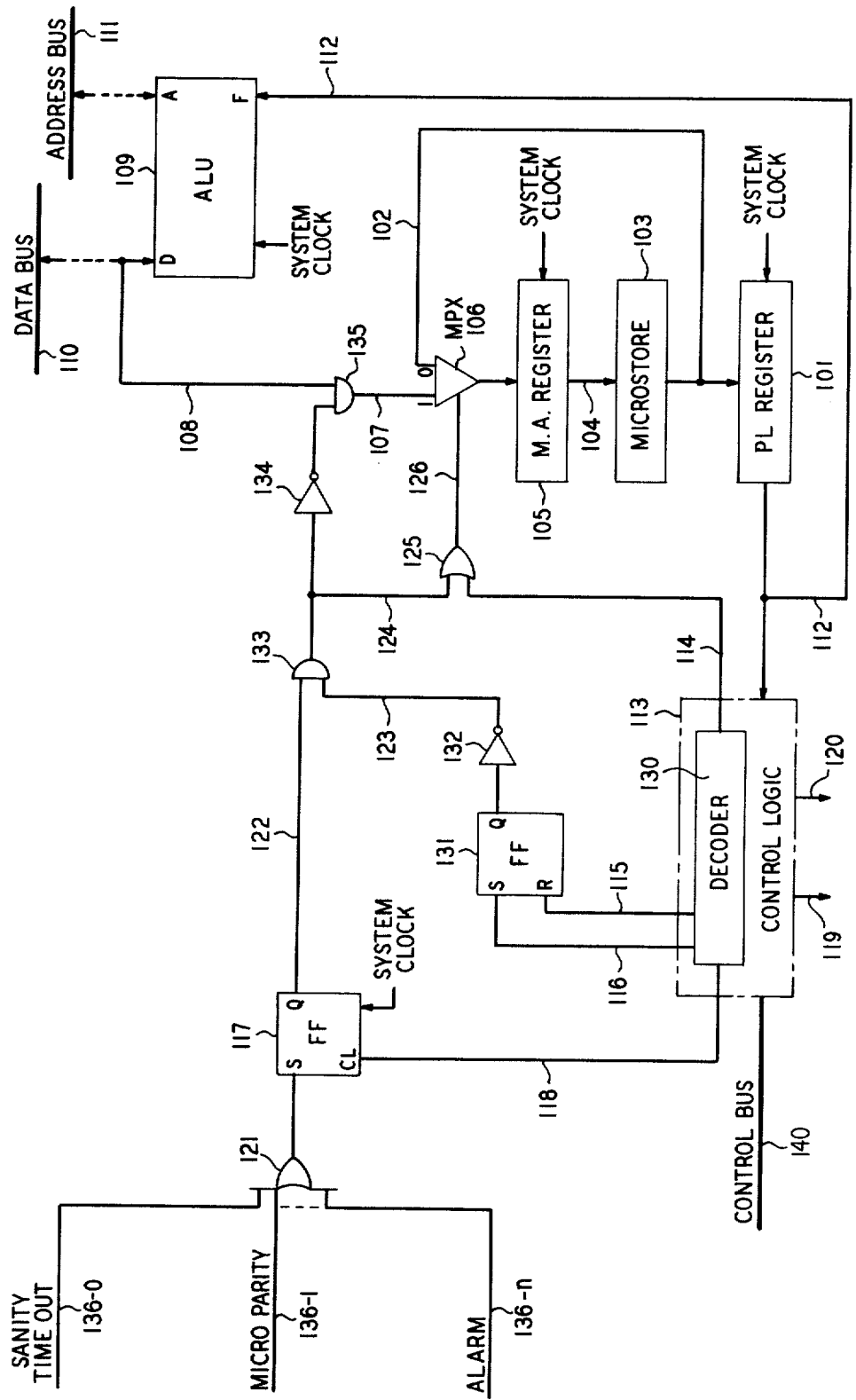

INTERRUPT CONTROL CIRCUIT

BACKGROUND OF THE INVENTION

1. Field of the Invention

This invention relates to a processor system and, in particular, to a processor having improved facilities for reliably setting a memory address register to a predetermined address. More particularly, this invention relates to processor circuitry for reliably setting a memory address register to a predetermined address upon the receipt of a signal representing a system trouble condition such as, for example, an error representing interrupt request.

2. Description of the Prior Art

The operation of a stored program controlled system requires that its memories reliably respond to the address commands they receive. This applies both to bulk memories comprising separate subsystems (system memory) as well as to hardware memories, often termed microstore memories, internal to the system's processor.

The processor and the system of which the processor is a part normally operates on the assumption (1) that the memory receives valid address information, and (2) that the memory correctly responds to the address information it receives. This assumption is tolerable since normally provided error detection facilities, alarm facilities, and the like generate an error signal if either the system memory or the microstore memory improperly respond to address commands. The generation of an error signal transfer the system from its normal mode of operation to an interrupt mode in which an error handling routine within the microstore is executed to determine the system's response to the trouble condition.

The receipt of an interrupt request representing a system trouble condition makes it is desirable to dispense with the assumption that the memory and the memory addressing facilities are error free and to insert increased error checking into the addressing and control operations for the microstore memory.

It is known how to provide facilities for setting a microstore address register to a specified address in response to the receipt of an interrupt signal. One such arrangement comprises an interrupt request register, a normally set control flip-flop, and an AND gate which is jointly controlled by the output of the register and the flip-flop. The set condition of the flip-flop and the receipt of an interrupt request by the request register transmits a signal through the AND gate to trigger a one-shot multivibrator. This generates a momentary output signal which jams an address register to the microstore address of the first word of an associated interrupt routine. The output of the one-shot multivibrator also resets the control flip-flop to disable the AND gate so that the system cannot respond for the time being to the receipt of any subsequent interrupt request. Instead of a one-shot, a momentary pulse can also be generated logically using the processor clocks to generate a short duration signal.

A typical prior art arrangement is shown on pages 6-22 and 6-23 of INTRODUCTION TO PROGRAMMING, Copyright 1972, Digital Equipment Corporation.

If there are no defects in this prior art circuitry, the contents of the microstore location specified by the address register are read out, subsequent words of the interrupt routine are read out, and the system executes the diagnostic actions built into the routine. The readout of the last word (or a word near the last) of the routine restores the control flip-flop to a set state to partially enable the AND gate so that the system may respond to other interrupt requests.

The foregoing interrupt facilities operate satisfactorily provided they are trouble-free and, in particular, provided that (1) the address register is successfully set to the address of the first word of the interrupt routine and (2) this first word is properly read out of memory. However, it is possible that the address register, or its related circuitry, or the microstore memory could be defective and improperly respond to the interrupt signal. This condition would not be promptly detected by the above described prior art circuit since (1) the output of the one-shot multivibrator could reset the control flip-flop to disable the AND gate and prevent the system from responding to further interrupt requests, (2) the output of the multivibrator might not be successful in setting the address register to the correct address, namely the address of the first word of the interrupt routine or (3) the contents of this first word may not be read out correctly. The system would therefore be locked in an inoperable state in which the address circuitry or microstore memory is inoperable and, at the same time, the reset state of the control flip-flop would prevent the same facilities from responding to any further error associated interrupt requests. It may therefore be seen that the currently available interrupt addressing facilities can contribute to system unreliability.

SUMMARY OF THE INVENTION

OBJECT

An object of the invention is to provide an improved memory addressing and control circuit.

Another object is to provide a processor having an improved microstore memory addressing and control circuitry for responding to an interrupt request.

A further object is to provide a control circuit which increases the probability of a memory address register being successfully set to the address of an interrupt routine in response to the receipt of an interrupt request.

SUMMARY DESCRIPTION

In accordance with my invention, a processor interrupt control and memory addressing circuit is provided which comprises a register flip-flop for receiving and registering interrupt requests, a control flip-flop, and an AND gate whose conductive state is jointly controlled by the outputs of the two flip-flops. The output of the AND gate is connected to circuitry which sets a memory address register to the address of the first word of a memory routine associated with a received interrupt request.

The control flip-flop is normally in a reset state in which its output partially enables the AND gate. The reception of an interrupt request sets the request flip-flop which, in turn, fully enables the AND gate. This transmits a signal from the output of the gate to activate circuitry which jams the address register to address of the first word of the interrupt routine. The control flip-flop is not immediately switched from a reset to a set state to disable the AND gate as is the case in prior art arrangements. Instead, it remains in its reset state, the AND gate remains enabled, and the output of the AND gate causes a signal to be applied continuously to the address register to force it to the interrupt routine address. The successful setting of the register to this address controls a microstore memory which then reads out the contents of the first word of the addressed interrupt routine. In accordance with normal processor techniques, subsequent words of the routine are then read out with the address register being advanced by bits read out of the memory as the routine is executed.

The request flip-flop and the control flip-flop in the circuit of my invention are switched from a reset to a set state by a signal from decoding facilities upon the readout of the first word of the interrupt routine. This first word is the only word in the microstore that contains the unique bit pattern which generates that signal in the decoding facility. This signal signifies that the address register has been successfully set, that the address register has applied the required address to the microstore, and that the microstore has read out the first word of the interrupt routine. The setting of the control flip-flop disables the AND gate and prevents any further interrupt request from being applied to the address register control circuitry for the time being. and it also allows the processor to access subsequent words of the routine. The processor and the microstore then sequence through subsequent words of the interrupt routine under control of the address register and the address bits read out of the microstore.

The diagnostic functions designed into the routine are executed as the routine is read out. The interrupt request flip-flop and the control flip-flop are switched from a set state back to a normally reset state at the end of the execution of the routine. This occurs when the last word (or a word near the last) of the subroutine is read out and applied to a decoder. The decoder decodes the bits of the last word, detects the existence of the unique bit pattern specifying that the flip-flops are to be reset and, in turn, applies a control signal over dedicated paths to reset the flip-flops. The resetting of the control flip-flop partially enables the AND gate whose other input is connected to the output of the interrupt request flip-flop. This permits the circuit to receive and respond to further interrupt requests.

The control of the set state of the control flip-flop by a word readout of the interrupt routine provides a positive indication that the processor is properly responding to an interrupt request. This also provides a positive indication that the memory address register is operating correctly and is addressing the memory with the required address information. The resetting of the control flip-flop at the end of the routine provides an indication that the interrupt routine has been successfully read out.

The switching of the control flip-flop to a set state only in response to the readout of the first word of the interrupt routine advantageously permits the control circuitry to continuously apply the address of the first word of the routine to the address register and the memory until (1) the memory is addressed with this information, (2) the contents of this specified memory location are read out, (3) the decoder properly decodes this first word, and (4) the control flip-flop is switched to a set state in response to the decoder output. The continuous application of this address information to the address register is an improvement over the prior arrangements using one-shot multivibrators or pulse generators and the like since the continuous application of the address information in accordance with my invention may overcome transient circuit defects which would permit the counter to respond properly to a applied signal.

In summary, the continuous application of a specified interrupt address to the address register and, in turn, to the memory, together with the control of the control flip-flop by a readout of the specified first word of the routine, provides an interrupt control circuit that eliminates many disadvantages of the prior art arrangement.

FEATURES

A feature of the invention is the provision of the facilities for detecting an interrupt request and for continuously applying the address of the first word of a specified interrupt routine to a memory address register.

A further feature is the provision of an interrupt control circuit in which the memory address register receives the continuously applied signal and, in turn, continuously applies corresponding address signals to a memory containing the interrupt routine that is to be executed.

A further feature is the provision of a control flip-flop which is normally in a reset state so interrupt requests to be extended to the interrupt control circuitry, and which is switched to a set state after a signal is received indicating that the memory address register and the memory have correctly responded to the interrupt request.

A further feature is the provision of circuitry for switching the control flip-flop to a set state under control of the successful setting of the memory and the memory address register to the interrupt routine address with the interrupt control circuitry then being isolated from any subsequently received interrupt requests so long as the flip-flop remains in a set state.

A further feature is the provision of facilities for switching the control flip-flop back to a reset state upon the execution of the last word (or a word near the last) of the interrupt routine whereby the interrupt control circuitry can respond to further interrupt requests.

DESCRIPTION OF THE DRAWING

These and other objects, advantages, and features of the invention will be more readily understood upon a reading of the following description of an exemplary embodiment of the invention taken in conjunction with the drawing in which FIG. 1 discloses a processor system embodying the invention.

DETAILED DESCRIPTION

The processor system of FIG. 1 comprises an arithmetic logic unit (ALU) 109, a data bus 110, an address bus 111, and a control bus 136. These permit the processor to exchange information including commands and data with a system memory (not shown) which contains program instructions and data, as well as with a peripheral system (not shown). The ALU transmits addresses to the system memory and to the peripheral system over the address bus. It exchanges data with the memory and the peripheral system over the data bus. The control bus transmits other types of signals from the processor to the memory and peripheral systems. Examples of the signals transmitted over the control bus are a write signal for a memory write operation, a read signal for a memory read operation, etc.

The details of the ALU are of no concern to the present invention, and this element may comprise any of a number of currently available devices such as, for example, Intel 3002 chips, each of which comprises a two-bit slice. The number of slices that would be required to comprise the ALU for any given application would depend upon the bit width of the address and data words that must be accommodated by the ALU. Address information is extended to the address bus from terminal A of the ALU; data words are exchanged with the data bus by terminal D; the signals applied to the F input of the ALU specify the work function that is to be executed on each processor operation.

The system of FIG. 1 further includes a microstore memory 103, a microaddress register 105 for applying address information to the microstore, a pipeline register 101 for receiving each word read out of memory 103, and a control logic element 113 having a decoder 130. The contents of the register 101 are extended over path 112 to logic element 113 and to the F input of the ALU. Logic element 113 generates control signals and applies them to various circuit points within the processor in response to the information it receives. The information received by the F input of the ALU specifies the logic or arithmetic operation the ALU is to perform on the data stored within its various internal registers or applied to its terminal D.

The ALU is controlled by high level program instructions stored in the system memory (not shown). These are received one at a time by the D input from data bus 110 in response to a memory read operation. Generally, each instruction specifies a processor task that is to be performed; each instruction also contains bits specifying the address of the beginning word of a microstore 103 routine that must be called for the processor to execute the specified task. Each microstore subroutine may comprise one or more microstore words.

AND gate 135 is normally partially enabled since the output of inverter 134 is normally high. The control input on path 126 of multiplexor 106 is normally high, a binary 1, and thus the 1 input of the multiplexor is normally connected signalwise to its output and, in turn, to the input of the microaddress register 105. This being the case, the receipt by the ALU of a high level system instruction from the system memory causes the bits of the instruction that contain the microstore address information to be applied from the D output of the ALU, over path 108, through AND gate 135, over path 107, through the multiplexer 106, to the microaddress register 105 where the address bits are registered under control of a strobe signal applied by the system clock. The address in register 105 is applied to memory 103 which reads out the contents of the location specified by the address bits and applies it to register 101. From there, this information is applied to the control logic circuit 113. The receipt of this information causes the circuit 113 to extend control, gating and other type signals to the various circuit points within the processor. The information stored in register 101 is also applied over path 112 to the F input of the ALU to specify the arithmetic or logical operation the ALU is to execute at this time.

The word received at this time by element 113 is decoded by decoder 130 and a binary 0 is extended over path 114, through OR gate 125, and over path 126 to the control input of multiplexor 106 to deactivate its 1 input and activate its 0 input which is connected to the output of the microstore 103. The activation of the 0 input of the multiplexor causes the bits in a field of the word currently read out of the microstore to provide the address information for the next word of the routine.

Thus, the initial word of a microstore routine is addressed by bits from the D output of the ALU; each succeeding word of the subroutine is addressed by the bits contained within words read out of the routine. The readout of the last word of a subroutine causes the decoder 130 to apply a binary 1 to path 114 and, in turn, to the control input of the multiplexor 106. This binary 1 activates the 1 input of the multiplexor and returns the control of the address register 105 to the D output of the ALU. The processor system of FIG. 1 is controlled in this manner with each high level instruction for the system memory specifying the address of the first word of a routine and with the address of the remaining words of the subroutine being provided by data bits stored within the routine itself.

The preceding describes the operation of the system of FIG. 1 for normal circuit conditions. As already mentioned, the system normally operates in a manner that assumes the operable condition of all circuit elements. This is acceptable since well known facilities such as error detectors, parity check circuits, sanity timeout circuits, invalid op-code detectors, etc. will promptly detect system trouble conditions. This would be the case, for example, if the address register 105 improperly responded to the receipt of an address from the D output of the ALU and addressed a microstore 103 location that is not the first word of a routine.

The operable state of all circuit elements cannot be assumed once a system trouble condition is detected. During such times, it is desirable to operate with an increased error checking and to check, wherever possible, that each portion of the system of FIG. 1 operates properly. The circuitry provided on FIG. 1 in accordance with my invention provides checking facilities which determine whether a specified word is successfully read out of memory 103 and entered into register 101 in response to the receipt of the address of the specified word by register 105. This operation is described in the following paragraphs.

Let it be assumed tht a word read out of memory 103 and stored in register 101 has bad parity. A parity check circuit normally included as a part of register 101 detects this condition and applies a binary 1 as a parity failure signal over path 136-1 to an input of OR gate 121. The output signal from the OR gate switches flip-flop 117 to a set state and drives the Q output of the flip-flop high. This high, binary 1, is extended over path 122 to the upper input of AND gate 133. Flip-flop 131 is normally in a reset state in which its Q output is low. This low, binary 0, is inverted by element 132 and applied as a binary 1 to the lower input of AND gate 133 to keep it in a partially enabled state during normal system conditions. This being the case, the binary 1 applied to the upper input of AND gate 133 as a result of the microparity failure signal causes gate 133 to apply a binary 1 over path 124 to the input of inverter 134. Element 134 inverts the binary 1 and applies a 0 to the left input of AND gate 135 to disable it and isolate the D output of the ALU from input 1 of multiplexor 106. The disabling of the AND gate 135 drives its output to an all 0s condition. This all 0s word is applied to input 1 of the multiplexor.

The binary 1 on the output of AND gate 133 is also extended through OR gate 125 and over path 126 to the control input of the multiplexor to select its input 1 as the addressing source for memory address register 105. This causes the all 0s word at the output of gate 135 to be applied to register 105.

Microstore 103 is programmed so that the first word of the routine that must be called in response to the receipt of an interrupt request has an address of all 0s. This being the case, the turnoff of AND gate 135 upon the receipt of an error signal on path 136-1 causes an address word of all 0s to be entered into register 105. Register 105 applies this all 0s address word over path 104 to microstore 103 to read out the first word of the routine. AND gate 135, multiplexor 106, and the address register 105 remain in their current state so that path 104 continuously applies the all 0s address word to microstore 103. This continuous application of the all 0s address word overcomes any transient or intermittent error conditions, such as those due to hit conditions, etc., associated with the circuitry between the output of AND gate 135 and the output of memory 103. This increases the probability of memory 103 being successfully addressed and the proper word being read out at this time. If it is not successfully addressed, the processor will sit in this state while, continuously applying the correct address and waiting for the proper response. A permanent error condition of the type that would prevent proper addressing would leave the processor locked up. Other facilities not shown such as, for example, timeout facilities, will detect the locked up state of the processor.

Let it be assumed that memory 103 is successfully addressed by the all 0s word. In this case, the first word of the error handling routine is read out of memory 103, entered into register 101, and from there applied to other circuit elements including control logic 113, decoder 130, and the F input of the ALU. Decoder 130 responds to the unique data pattern programmed into the first word and applies a signal to path 116 to switch flip-flop 131 from a reset to a set state in which the Q output of the flip-flop is high, a binary 1. This binary 1 is inverted by element 132 and applied as a 0 over path 123 to the lower input of AND gate 133 to disable it and drive its output to a binary 0.

At this time, OR gate 125 and path 126 no longer receive a binary 1 from gate 133 and, therefore, the control of the multiplexor 106 is switched from its one input to its 0 input. The activation of the 0 input of the multiplexor turns effectively connects the input of register 105 to the output of the memory 103 so that the bits stored within the error handling routine control the addressing of memory 103. The memory 103 and register 105 now advance one word at a time through the error handling routine and the processor executes the tasks specified by the routine.

FIG. 1 discloses a plurality of paths 136, each of which is associated with a unique system trouble condition. Path 136-0 is associated with a sanity timeout signal; path 136-1 is associated with a microparity failure; path 136-n is associated with a system alarm condition. Other paths 136 would normally be provided to respond to other system failure states as required.

It has already been assumed that the presently described error handling request was generated as a result of microparity failure and, consequently, path 136-1 is activated and flip-flop 117 is set via gate 121 as already described. This causes register 105 and memory 103 to advance sequentially and execute the error handling routine. The specific action performed at this time is immaterial to the present invention and could comprise any of a number of possibilities. For example, the processor could transmit information over data bus 110 and address bus 111 to increment a software counter in the system memory to record a microparity failure. Alternatively, it could use the address bus and the data bus to increment a hardware counter or to actuate system alarm apparatus such as, for example, a lamp indicating a microparity failure.

Ultimately, the last word of the interrupt routine (or a word near the last) is read out of memory 103 and entered into register 101. The data programmed into this word activates decoder 130 and causes a signal to be applied over paths 115 and 118 to the reset inputs of flip-flops 131 and 117 to switch them to a reset state. (This could also be done as two separate actions: first by clearing flip-flop 117 and then by later resetting flip-flop 131.) The resetting of flip-flop 131 drives the Q output of the flip-flop low, the output of the inverter 132 high, and partially enables AND gate 133 so that it can respond to a newly received interrupt request signal and apply it to inverter 134, gate 135, and element 106. The resetting of flip-flop 117 permits it to respond to a newly received interrupt request.

The control of flip-flop 131 by bits read out of memory 103 is advantageous in that the flip-flop is switched to a set state to disable the circuit of FIG. 1 from responding to any further interrupt requests only if a received interrupt request successfully addresses memory 103. In the prior art arrangements, the flip-flop analogous to element 131 is set immediately upon the receipt of an interrupt request. Conceivably, in the event of a trouble condition in the multiplexor or register 105, the receipt of an interrupt request in accordance with the prior art arrangements could set a flip-flop such as 131 to disable a gate such as 133 and prevent the circuit from recognizing any further interrupt requests. Yet, because of the trouble condition associated with the multiplexor, the register, or the memory 103, the first word of the interrupt routine might not be successfully read out. In this case, the processor would be disabled and would remain in its disabled state until some sort of corrective action as taken.

The circuitry provided in accordance with my invention prevents the processor from being permanently disabled due to a momentary or transient trouble conditions. Thus, the flip-flop 131 is not set until the memory 103 is set to the correct address and reads out the first word of the microroutine associated with the interrupt request. At that time, and only at that time, is the flip-flop switched to its set state to disable gate 133 and prevent the rest of the circuitry of FIG. 1 from responding to any newly received interrupt requests. The control of flip-flop 131 in this manner and the direct connection of AND gate 135 via the multiplexor to the input of register 105 continuously applies the all 0s address word to the register. If register is operable, it continuously applies the all 0s word over path 104 to the memory 103. The continuous application of this address information overcomes problems caused by transient or hit conditions.

What is claimed is:
1. In a processor system,
   a memory having at least one plural word program subroutine,
   a memory address register,
   means for receiving an interrupt request,
   means including a normally enabled gating means responsive to the receipt of a request for continuously applying a first address word to said register to set it to a predetermined address specifying a unique location in said memory, said location containing the first program word of a subroutine associated with said interrupt request, means controlled by said address register upon said application of said first address word for reading out said first program word from said memory location, means for disabling said gating means in response to said readout of said first program word, and means responsive to the disabling of said gating means for terminating the application of said first address word to said register, said gating means being ineffective when disabled to respond to any subsequently received interrupt requests.

2. The system of claim 1 in which said system further comprises, additional means responsive to the readout of said first program word for applying further address words to said register to read out each subsequent word of said subroutine, and means responsive to the readout of a predetermined subsequent word of said subroutine for reenabling said gating means, said gating means being effective when reenabled to respond to a subsequently received interrupt request.

3. In a processor system, a memory having at least one plural word program subroutine, a memory address register, a first means for normally applying address information to said register to control the readout of information from said memory, means for controlling the operation of said processor in response to said readout, means for receiving an interrupt request, means including a normally enabled gating means responsive to the receipt of a request for disabling said first means, means responsive to said disabling for continuously applying a first address word to said register to set it to a predetermined address specifying a unique location in said memory, said location containing the first program word of a subroutine associated with said interrupt request, means controlled by said address register upon said application of said first address word for reading out said first program word from said memory location, means for disabling said gating means in response to the readout of said first word, and means responsive to the disabling of said gating means for removing the application of said first address word from said register, said gating means being ineffective when disabled to respond to a subsequently received interrupt request.

4. The system of claim 3 in which said system further comprises, additional means responsive to the readout of said first program word for applying address information to said register to read out each subsequent word of said subroutine, means responsive to the readout of a predetermined subsequent word of said subroutine for reenabling said gating means, said gating means being effective when reenabled to respond to a subsequently received interrupt request, and means responsive to the readout of the last word of said subroutine for reenabling said first means.

5. In a processor system, a memory containing at least one plural word program subroutine, a memory address register, a control flip-flop, a first normally enabled gate, a second normally enabled gate, means for receiving an interrupt request, means responsive to the receipt of an interrupt request for extending a signal from said first gate to an input of said second gate to inhibit said second gate, means responsive to the inhibiting of said second gate for continuously applying a first address word from said second gate to said register to set it to a predetermined address specifying a unique location in said memory, said location containing the first program word of a subroutine associated with said interrupt request, means controlled by said address register upon the receipt of said address word for reading out said first program word of said subroutine from said memory location, means responsive to the readout of said first word for switching said flip-flop from a first to a second state, means responsive to said switching for inhibiting said first gate to prevent it from responding to a subsequently received interrupt request, and means responsive to said inhibiting of said first gate for removing the application by said second gate of said first address word from said register.

6. The system of claim 5 in which said system further comprises, additional means responsive to the readout of said first program word for applying address information from an output of said memory to said register to read out subsequent words of said subroutine, and means responsive to the readout of a predetermined subsequent word of said subroutine for switching said flip-flop back to said first state, said first gate being reenabled in response to said switching of said flip-flop back to said first state, said first gate being effective when reenabled to respond to a subsequently received interrupt request.

7. A system of claim 6 in which said system further comprises, a first source of address information, a steering circuit having at least two inputs, means for normally extending address information from said first source through said second gate when enabled to a first input of said steering circuit, means for extending said information through said steering circuit to an input of said address register to control the readout of said information from said memory, means for controlling the operation of said processor in response to said readout, means responsive to the inhibiting of said second gate upon the receipt of an interrupt request for inhibiting said first source and for extending said first address word from said second gate through said steering circuit at its first input of said address register, means responsive to the readout of said first program word from said memory for switching said steering circuit from its first to its second input, means for applying said address information read out of said memory through said steering circuit at its second input to said address register to control the addressing of said memory as said subroutine is read out, and means further responsive to the readout of the last word of said subroutine for switching said steering circuit from its second to its first input so that address information from said first source may again be applied to said address register.

8. A method of operating a memory controlled processor system comprising the steps of,
  (1) detecting the receipt of an interrupt request signal representing an abnormal system condition,
  (2) extending a received interrupt request signal through a normally enabled gate to a control means,
  (3) continuously applying to said memory from said control means a first address word representing the memory location of the first program word of an interrupt subroutine associated with said abnormal condition,
  (4) reading out said first program word from said memory upon the receipt of said first address word,
  (5) switching said gate to an inhibited state in response to said readout of said first program word, said gate being unable to respond to any interrupt request received while said gate is in an inhibited state,
  (6) reading out subsequent words of said subroutine under control of address information read out of said memory and applied to said control means, and
  (7) reenabling said gate to permit said gate to respond to newly received interrupt requests when a predetermined subsequent word of said subroutine is read out.

9. A method of operating a memory controlled processor system comprising the steps of,
  (1) addressing said memory from a first source during normal system conditions,
  (2) detecting the receipt of an interrupt request signal representing an abnormal system condition,
  (3) extending a received interrupt request signal through a first normally enabled gate to a second normally enabled gate to inhibit said second gate,
  (4) disabling said first source in response to the inhibiting of said second gate to prevent said first source from addressing said memory,
  (5) continuously applying from said inhibited gate to said memory a first address word representing the memory location of the first program word of a plural word interrupt subroutine associated with said abnormal condition,
  (6) reading out said first program word from said memory upon the receipt of said first address word,
  (7) decoding said first program word upon its readout,
  (8) switching said first gate to an inhibited state in response to said decoding of said first program word, said first gate being unable to respond to any interrupt request received while said first gate is in an inhibited state,
  (9) reading out subsequent words of said subroutine under control of address information read out of said memory, and
  (10) reenabling said first gate to permit said first gate to respond to a newly received interrupt request when a predetermined subsequent word of said subroutine is read out.

* * * * *